US006784888B2

United States Patent
Taylor et al.

(10) Patent No.: US 6,784,888 B2
(45) Date of Patent: Aug. 31, 2004

(54) METHOD AND APPARATUS FOR EXECUTING A PREDEFINED INSTRUCTION SET

(75) Inventors: Ralph C. Taylor, Deland, FL (US); Michael A. Mang, Oviedo, FL (US); Michael J. Mantor, Orlando, FL (US)

(73) Assignee: ATI Technologies, Inc., Ontario (CA)

( * ) Notice: Subject to any disclaimer, the term of this patent is extended or adjusted under 35 U.S.C. 154(b) by 281 days.

(21) Appl. No.: 09/969,669

(22) Filed: Oct. 3, 2001

(65) Prior Publication Data

US 2003/0067473 A1 Apr. 10, 2003

(51) Int. Cl.[7] .............................................. G06T 15/00
(52) U.S. Cl. ....................... 345/522; 345/561; 345/426; 708/523; 708/490; 708/501
(58) Field of Search ................................. 345/561, 522, 345/426, 501, 506; 712/208, 200, 210; 708/523, 490, 501, 620, 670

(56) References Cited

U.S. PATENT DOCUMENTS 6,333,744 B1 * 12/2001 Kirk et al. .................. 345/506

* cited by examiner

Primary Examiner—Matthew C. Bella
Assistant Examiner—Hau Nguyen
(74) Attorney, Agent, or Firm—Vedder, Price, Kaufman & Kammholz, PC

(57) ABSTRACT

The occurrence of an (n+m) input operand instruction that requires more than n of its input operands from an n-output data source is recognized by a programmable vertex shader (PVS) controller. In turn, the PVS controller provides at least two substitute instructions, neither of which requires more than n operands from the n output data source, to a PVS engine. A first of the substitute instructions is executed by the PVS engine to provide an intermediate result that is temporarily stored and used as an input to another of the at least two substitute instructions. In this manner, the present invention avoids the expense of additional or significantly modified memory. In one embodiment of the present invention, a pre-accumulator register internal to the PVS engine is used to store the intermediate result. In this manner, the present invention provides a relatively inexpensive solution for a relatively infrequent occurrence.

26 Claims, 4 Drawing Sheets though other applications are possible as well. The PVS 200 of FIG. 2 includes a PVS engine 202 that is coupled to a control memory 204, an input memory 206, an output memory 208, a constant memory 210 and a temporary register memory 212. The control memory 204 stores the instructions for controlling the PVS engine 202. The control memory 204 may also be referred to as the code memory, as it stores the code, comprising a series of instructions, that is used to control the PVS engine 202. As noted above, the PVS engine 202 is a generic processing device that is capable of executing instructions from a finite set of such instructions.

US 6,784,888 B2

1
METHOD AND APPARATUS FOR EXECUTING A PREDEFINED INSTRUCTION SET

CROSS-REFERENCE TO RELATED APPLICATION

A related case is prior U.S. Patent Application having Ser. No. 09/556,472, entitled VECTOR ENGINE WITH PRE-ACCUMULATION BUFFER AND METHOD THEREFORE, filed Apr. 21, 2000 by Mang et al., the same inventors as in the present application, which prior application is assigned to ATI Technologies, Inc., the same assignee as in the present application, and which prior application is hereby incorporated by reference verbatim, with the same effect as though the prior application were fully and completely set forth herein.

FIELD OF THE INVENTION

This invention relates generally to video graphics processing and, more particularly, to a method and apparatus for executing a predefined instruction set.

BACKGROUND OF THE INVENTION

As is known, a conventional computing system includes a central processing unit, a chip set, system memory, a video graphics processor, and a display. The video graphics processor includes a raster engine and a frame buffer. The system memory includes geometric software and texture maps for processing video graphics data. The display may be a cathode ray tube (CRT) display, a liquid crystal display (LCD) or any other type of display. A typical prior art computing system of the type described above is illustrated in FIG. 1. As shown in FIG. 1, the system 100 includes a host 102 coupled to a graphics processor 104 and a display 106. The host 102 comprises the central processing unit, chip set and system memory as described above. The host 102 is responsible for the overall operation of the system 100. In particular, the host 102 provides, on a frame by frame basis, video graphics data to the display 106 for display to a user of the system 100. The graphics processor 104, which comprises the raster engine and frame buffer, assists the host 102 in processing the video graphics data.

To process video graphics data, particularly three dimensional (3D) graphics, the central processing unit executes video graphics or geometric software to produce geometric primitives, which are often triangles. A plurality of triangles is used to generate an object for display. Each triangle is defined by a set of vertices, where each vertex is described by a set of attributes. The attributes for each vertex can include spatial coordinates, texture coordinates, color data, specular color data or other data as known in the art. Upon receiving a geometric primitive, the raster engine of the video graphics processor generates pixel data based on the attributes for one or more of the vertices of the primitive. The generation of pixel data may include, for example, texture mapping operations performed based on stored textures and texture coordinate data for each of the vertices of the primitive. The pixel data generated is blended with the current contents of the frame buffer such that the contribution of the primitive being rendered is included in the display frame. Once the raster engine has generated pixel data for an entire frame, or field, the pixel data is retrieved from the frame buffer and provided to the display.

Recently, Microsoft Corporation promulgated a standard relating to the processing of video graphics, i.e., the so-called DirectX 8.0 Standard. Among other things the DirectX Standard calls for the use of a programmable vertex shader. As its name would imply, a programmable vertex

2 shader (PVS) is essentially a generic processing device that may be programmed using a finite set of instructions. The set of instructions is particularly designed for use in processing graphics primitives, and the instructions are executed by a PVS engine. To this end the PVS engine is also coupled to a temporary register memory that, by standard, comprises three read output ports. The three read output ports are provided as inputs to the PVS engine. However, the number of instructions that actually require all three ports in order to be executed by the PVS engine is relatively small. For example, a so-called multiply-and-add (MADD) instruction is included in the instruction set. The MADD instruction multiplies two input operands and adds the result to a third input operand all in one clock cycle, e.g., (a×b)+c where a and b are multiplicands and c is an addend. It is possible, however, that the three input operands for the MADD instruction must come from the temporary register memory. This relatively infrequent occurrence is accommodated by the DirectX 8.0 Standard through the provision of three ports to the temporary register memory.

Those having ordinary skill in the art recognize the attractiveness of providing only two read ports for the temporary registers memory. That is, due to the relatively infrequent occurrence of instructions requiring three input operands from temporary register memory, and due to the efficiencies (both in terms of cost and complexity) that could be realized, it would be advantageous to provide a DirectX 8.0-compliant PVS implementation that requires only two temporary register memory ports. However, in order to provide such an implementation, the relatively infrequent, but nonetheless possible, occurrence of an instruction requiring three input operands from temporary register memory must be accommodated.

A solution to this problem is to inspect the code memory, where the currently-implemented instructions are stored, for occurrences of a MADD instruction requiring all of its inputs from the temporary register memory. Upon finding an instruction of this type, substitute instructions could be placed into the code memory in place of the identified MADD instruction. For example, the MADD instruction could be replaced by a multiply instruction and an additional add instruction. One shortcoming, however, with this solution is that it would require the length of the code memory to be doubled to accommodate the worst case scenario in which all of the instructions stored in the code memory comprise MADD instructions of this type. Such a solution is therefore prohibitively expensive.

Therefore, a need exists for a technique that accommodates the occurrence of instructions requiring a number of input operands greater than the output capacity of the temporary register memory. Stated more generally, such a technique should accommodate the occurrence of an instruction requiring (n+m) input operands with more than n of the input operands coming from an n-output data source. Additionally, such a technique should not require significant additions of, or modifications to, memory.

DETAILED DESCRIPTION OF A PREFERRED EMBODIMENT OF THE INVENTION

The present invention provides a technique that accommodates the occurrence of an (n+m) input operand instruction that requires more than n of its input operands from an n-output data source. In particular, as such an instruction is provided to the PVS engine, a PVS controller recognizes the instruction and provides at least two substitute instructions, neither of which requires more than n operands from the n output data source. A first of the substitute instructions is executed by the PVS engine to provide an intermediate result that is temporarily stored and used as an input to another of the at least two substitute instructions. In this manner, the present invention avoids the expense of additional or significantly modified memory. To the contrary, in one embodiment of the present invention, a pre-accumulator register internal to the PVS engine is used to store the intermediate result. In this manner, the present invention provides a relatively inexpensive solution for a relatively infrequent occurrence.

Figure 1:
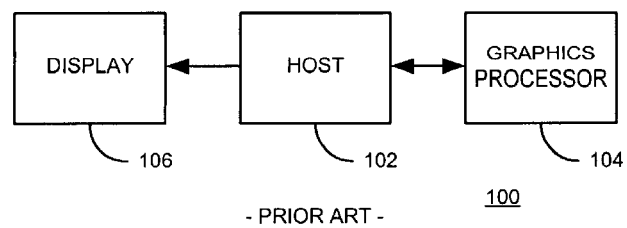
FIG. 1 is a block diagram of a computing system in accordance with the prior art.
Figure 2:
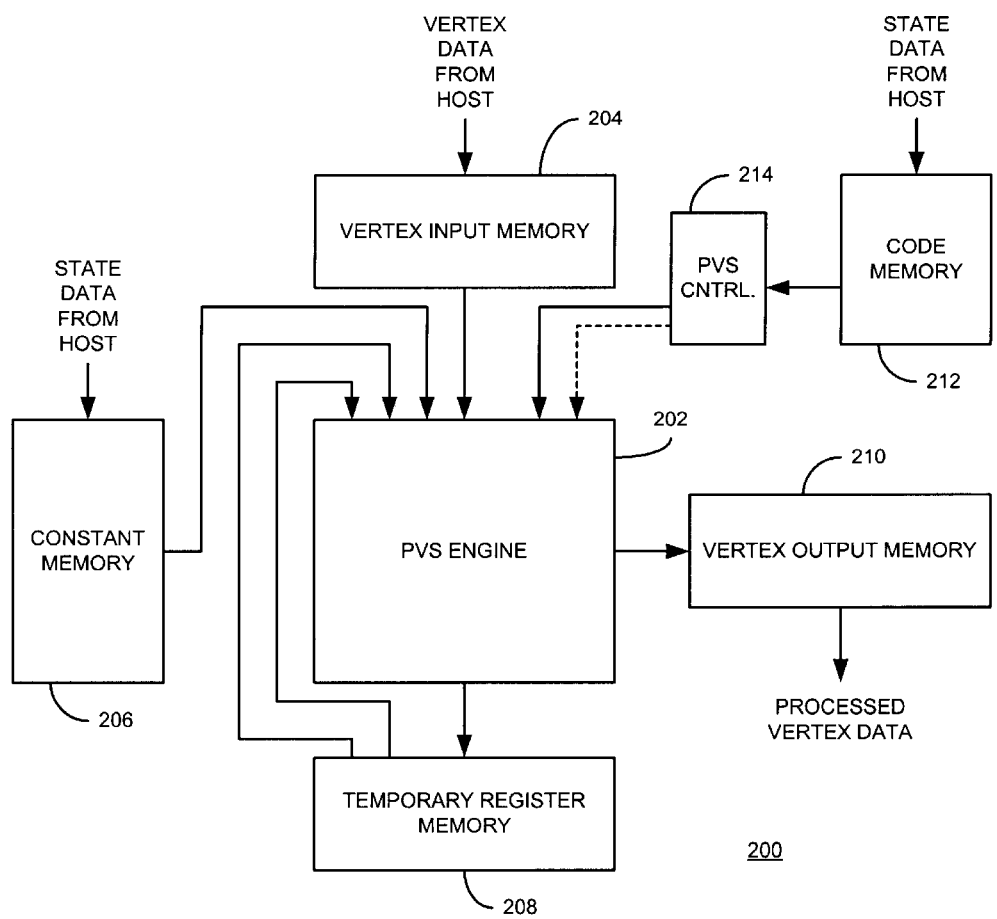
FIG. 2 is a block diagram of a programmable vertex shader in accordance with the present invention.

The present invention may be more fully understood with reference to FIGS. 2–5. Referring now to FIG. 2, a PVS 200 is illustrated comprising a programmable vertex shader engine 202 coupled to a vertex input memory 204, a constant memory 206, a temporary register memory 208, and a vertex output memory 210. Additionally, the PVS engine 202 is coupled to a code memory 212 via a PVS controller 214. Preferably, each of the blocks illustrated in FIG. 2 is implemented as part of a dedicated hardware platform. In general, the PVS 200 operates upon vertex data received from a host using state data also received from the host. As known in the art, the vertex data comprises information defining attributes such as x, y, z and w coordinates, normal vectors, texture coordinates, color information, fog data, etc. Typically, the vertex data is representative of geometric primitives (i.e. triangles). A related group of primitives defines a given state. That is, state data comprises all data that is constant relative to a given set of primitives. For example, all primitives processed according to one texture define one state, while another group of primitives processed according to another texture define another state. Those having ordinary skill in the art can readily define a variety of other state-differentiating variables, other than texture, and the present invention is not limited in this regard.

In accordance with the present invention, state data comprises either code data or constant data. The code data takes the form of instructions or operation codes (op codes) selected from a predefined instruction or op code set. For example, code-based state data typically defines one or more operations to be performed on a set of primitives. In this same vein, constant state data comprises values used in the operations performed by the code data upon the graphics primitive. For example, constant state data may comprise values in transformation matrices used to rotate graphically displayed objects.

Based on the state data provided by the host, the PVS engine 202 operates upon the graphics primitives. A suitable implementation for the PVS engine 202 (or computation module) is described in U.S. patent application Ser. No. 09/556,472, the teachings of which application have been incorporated herein by reference. In particular, the PVS engine 202 performs various mathematical operations including vector and scalar operations. For example, the PVS engine 202 performs vector dot product operations, vector addition operations, vector subtraction operations, vector multiply-and-accumulate operations, and vector multiplication operations. Likewise, the PVS engine 202 implements scalar operations, such as an inverse of x function, an x to the y function, an e to the x function, and an inverse of the square root of x function. Techniques for implementing these types of functions are well known in the art and the present invention is not limited in this regard. As shown in FIG. 2, the PVS engine 202 receives input operands from the vertex input memory 204, the constant memory 206 and the temporary register memory 208. As noted above, the PVS engine 202 receives instructions or op codes out of the code memory 212 via the PVS controller 214. Additionally, the PVS engine 202 receives control signals, illustrated as a dotted line in FIG. 2, from the PVS controller 214. The vertex output memory 210 receives output values provided by the PVS engine 202 based upon the execution of the instructions provided by the code memory 212 and the PVS controller 214.

The vertex input memory 204 represents the data that is provided on a per vertex basis. In a preferred embodiment, there are sixteen vectors (a vector is a set of x, y, z and w coordinates) of input vertex memory available. During any single instruction cycle by the PVS engine 202, only a single operand is available from the vertex input memory 204. The constant memory 206 preferably comprises one hundred and ninety two vector locations for the storage of constant values. Likewise, only a single operand may be provided from the constant memory 206 to the PVS engine 202 during a single instruction cycle execution. The temporary register memory 208 is provided for the temporary storage of intermediate values calculated by the PVS engine 202. The temporary register memory 208 can provide no more than two input operands to the PVS engine 202 during a single clock cycle. In general, however, it is understood that the present invention is more broadly applicable to situations in which a data source is limited to n outputs but where instructions executed by the PVS engine 202 may require more than n inputs from the n-output source. To handle this situation, the PVS controller 214 of the present invention recognizes instructions of this type and provides at least two substitute instructions each of which requires no more than n operands from the n output source. This is described in greater detail with reference to FIG. 3.

Figure 3:
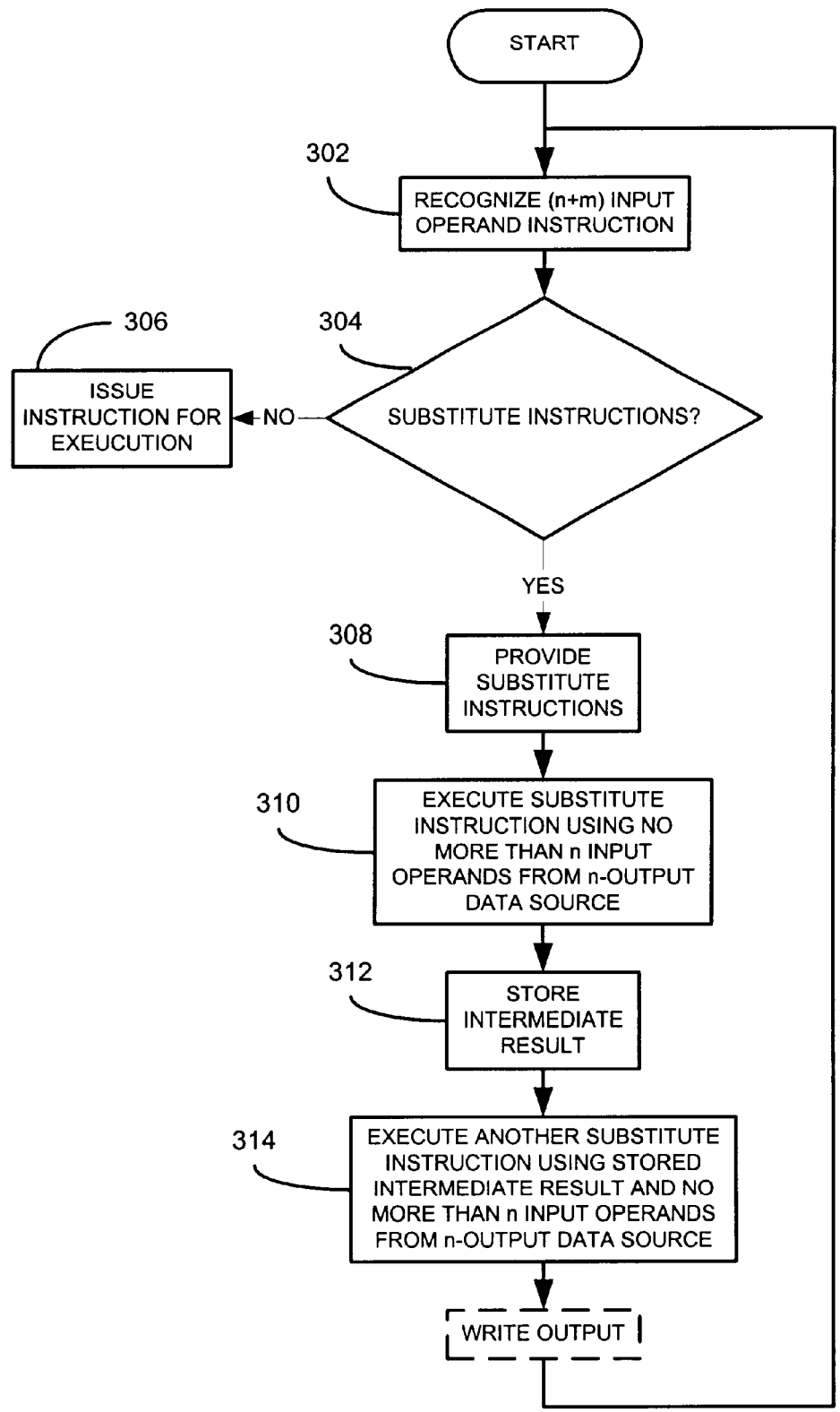
FIG. 3 is a flow chart illustrating operation of a programmable vertex shader in accordance with the present invention.

Referring now to FIG. 3, a flow chart illustrates the operation of the PVS controller 214 and PVS engine 202 in accordance with the present invention. In particular, blocks 302 are 304 are preferably implemented by the PVS controller 214 in conjunction with a host-implemented driver routine (not shown) that provides the instructions to the PVS 200, blocks 306 and 308 are implemented by the PVS controller 214, and blocks 310 through 314 are preferably executed by the PVS engine 202. Starting at block 302, the occurrence of an n+m input operand instruction is recognized. More particularly, the driver performs checking to see if an incoming instruction is an instruction in which more than n of the n+m input operands are required from a single n output source; in a preferred embodiment, a MADD instruction with all 3 source operands from unique temporary memory locations. If the driver finds such an instruction, then the driver replaces the MADD instruction with a MADD_MACRO instruction.

Thereafter, at block 304, the PVS controller 214 determines whether to provide substitute instructions for the instruction requiring n+m operands. In a preferred embodiment, the PVS controller 214 looks for the MADD_MACRO opcode to determine whether or not to expand the instruction to two instructions If not, processing continues at block 306 where the current (n+m) input operand instruction is issued by the PVS controller to the PVS engine for execution. This may be the case, for example, where the MADD instruction requires a single multiplicand and addend from the temporary register memory and an additional multiplicand from the constant memory.

If, however, the condition of block 304 is satisfied the PVS controller provides at least two substitute instructions at block 308, wherein each of the substitute instructions requires no more than n input operands from the n output data source. Referring again to the example of the MADD instruction described above, the substitute instructions comprise a multiply instruction followed by an additional MADD instruction in which one of the multiplicands is set to unity. Table 1 below illustrates an exemplary MADD instruction giving rise to the problem addressed by the present invention:

TABLE 1

| MADD | Dest, R0, R1, R2 |
|---|---|

In the op code illustrated in Table 1, the first symbol "Dest" indicates to the PVS engine where to write the result of the multiply-and-add operation. The "R0", "R1" and "R2" symbols are indicative of input operands to be retrieved from the temporary register memory such that the MADD instruction calculates (for each vector component x, y, z and w) the product of the values found in R0 and R1, which product is added to the value found in R2. Upon recognizing an instruction of this type, the PVS controller provides the exemplary substitute instructions shown in Table 2:

TABLE 2

| MUL | Pre-Accumulator, R0, R1 |
|---|---|
| MADD | Dest, R2, Force__1.0, Pre-Accumulator |

In these substitute instructions, "Dest", "R0", "R1", and "R2" have the same meanings. The "Pre-Accumulator" symbol is an internal register used to temporarily store the multiplication product, and the "Force__1.0" symbol causes unity (1.0) to be used as one of the multiplicands in the substitute MADD instruction.

Note that, because the PVS controller provides substitute instructions "on the fly", the need to provide additional code memory is eliminated. Because the substitute instructions are dependent upon each other, a priority indication is preferably provided by the PVS controller to the PVS engine as illustrated by the dotted line in FIG. 2. The priority indication insures that the PVS engine will sequentially execute the substitute instructions.

Returning to FIG. 3, at block 310, the PVS engine executes a first of the substitute instructions using no more than n input operands from the n output data source. Thereafter, the PVS engine stores an intermediate result. For example, the PVS engine may store the intermediate result in the temporary register memory. However, this implementation is not preferred because it would corrupt a temporary register memory location and result in additional latency when later accessing the stored intermediate result. In a preferred embodiment, the intermediate result is stored in an internal register of the PVS engine. This is the pre-accumulator register mentioned above and described in greater detail below with regard to FIGS. 4 and 5. At block 314, another substitute instruction is executed by the PVS engine, which instruction uses the stored intermediate result and no more than n input operands from the n output data source. Note that because the subsequent substitute instruction required the use of the stored intermediate result, the first substitute instruction is provided to the PVS engine along with a priority indication which instructs the PVS engine to sequentially execute the substitute instructions such that the stored intermediate result will not be lost or overwritten. Referring again to the example illustrated in Tables 1 and 2 above in which a MADD instruction is replaced by a multiply instruction and an additional MADD instruction, the multiply instruction is first executed using no more than two input operands from the temporary register memory, i.e., "R0" and "R1". The result of the multiply instruction is temporarily stored in the pre-accumulator and thereafter provided as an input operand to the additional MADD instruction in which a single input operand is retrieved from the temporary register memory (the "R2" operand), multiplied by one (the "Force__1.0" operand), and the result added to the value temporarily stored. In this manner, the overall effect of the original MADD instruction is achieved by two substitute instructions, neither of which requires more than n input operands from the n output data source (i.e. the temporary register memory), where, in this case, n=2.

Finally, at block 316, an output result based on the execution of the at least two substitute instructions may be optionally provided. This would be the case, for example, where the original MADD instruction was the last instruction stored in the code memory and the destination address included in the MADD instruction instructed the PVS engine to output the result to the vertex output memory. Alternatively, the output result may be based on previously executed instructions that included the substitute instructions.

Figure 4:
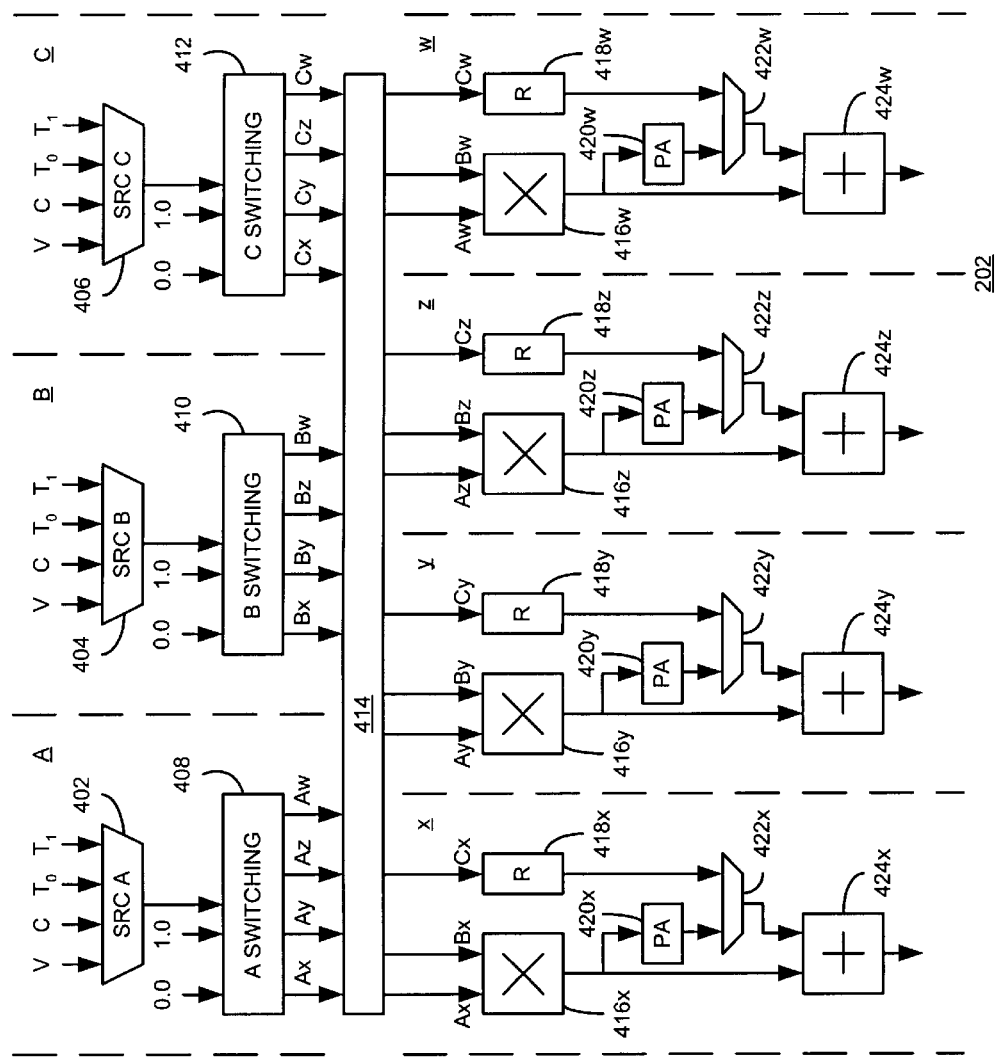
FIG. 4 is a block diagram of an embodiment of the programmable vertex shader engine that may be used to implement the present invention.

Referring now to FIG. 4, a block diagram illustrating a portion of the PVS engine 202 is illustrated. In particular, a plurality of input multiplexers 402–406 are coupled to corresponding switching blocks (sometimes referred to as "swizzle" blocks) 408–412. The combination of input multiplexers and switching blocks respectively define a plurality of sources labeled A, B and C. Each source corresponds to a potential input operand for instructions executed by the PVS engine. As shown, each input multiplexer 402–406 takes as input a single output from the vertex input memory, represented by the symbol V, a single input from the constant memory, represented by the symbol C, and two inputs from the temporary register memory, represented by the symbols T0 and T1. Recall that each input V, C, T0 or T1 comprises a vector having x, y, z and w components. Using selection signals (not illustrated) any of the inputs presented to an input multiplexer may be provided on the output of the input multiplexer. The output of the multiplexers are provided to corresponding switching (swizzle) blocks 408–412. The switching blocks 408–412, in turn, provide a series of outputs, via an addressing network 414, to a plurality of channels labeled x, y, z, and w. The outputs of each switching block constitute the components of a vector input value, wherein each component corresponds to one of the channels. For example, the output of the A switching (swizzle) block 408 comprises an Ax component, an Ay component, an Az component, and an Aw component. Thus, each input to the multiplexers 402–406 comprises a four-component vector that may be provided at the output of the respective switching (swizzle) blocks 408–412. Additionally, each switching (swizzle) block includes an input representative of 0.0 and another input representative of 1.0, as shown in FIG. 4. In addition to the outputs of the input multiplexers, each switching (swizzle) block may provide either the 0.0 value or the 1.0 value as the output for any combination of its components, i.e., there is independent swizzle control for each component (e.g., Ax, Ay, Az and Aw, etc.) or each source operand. For example, Ax could be "swizzled" to 1.0 while Ay is swizzled to Ax and Az is swizzled to 0.0, etc.

As shown, each channel comprises a multiplier 416, a delay register 418, a pre-accumulator register 420, a selection block 422 and an adder 424. As shown, the A and B components for each channel are provided to the multiplier 416. The C component for each channel is provided to the delay register 418. The delay register 418 serves to synchronize processing of the C component for any channel with the processing of the A and B components through the corresponding multiplier 416. The output of the multiplier 416 may be provided directly to the adder 424 or the pre-accumulation register 420. In turn, the selection blocks 422 may be manipulated to provide at its output at least the value stored in either the pre-accumulation register 420 or delay register 418. In accordance with the present invention, the pre-accumulation register 420 is used for the temporary storage of intermediate values resulting from the execution of a first substitute instruction and used thereafter by a subsequent substitute instruction. For example, in the case of an MADD instruction that has been split into substitute multiply and MADD instructions, the multiply instruction is executed first and the resulting value is stored in the pre-accumulation register. Based on the control signal provided by the PVS controller (i.e., the dotted line in FIG. 2), the PVS engine knows to execute the substitute instructions as priority instructions, i.e. to execute the substitute instructions in a sequential manner. As such, the PVS engine directs the output of the multiplier 416 to the pre-accumulation register 420 using control signals not illustrated in FIG. 4. Thereafter, upon execution of the additional MADD instruction, the addend input of the original MADD instruction is multiplied by a value of 1 in the multiplier 416 and added to the value stored in the pre-accumulator register 420 as provided to the adder 424 by the selection block 422. Because these operations are performed on a vector basis, the above described operations are performed on each of the x, y, z, and w channels.

Figure 5:
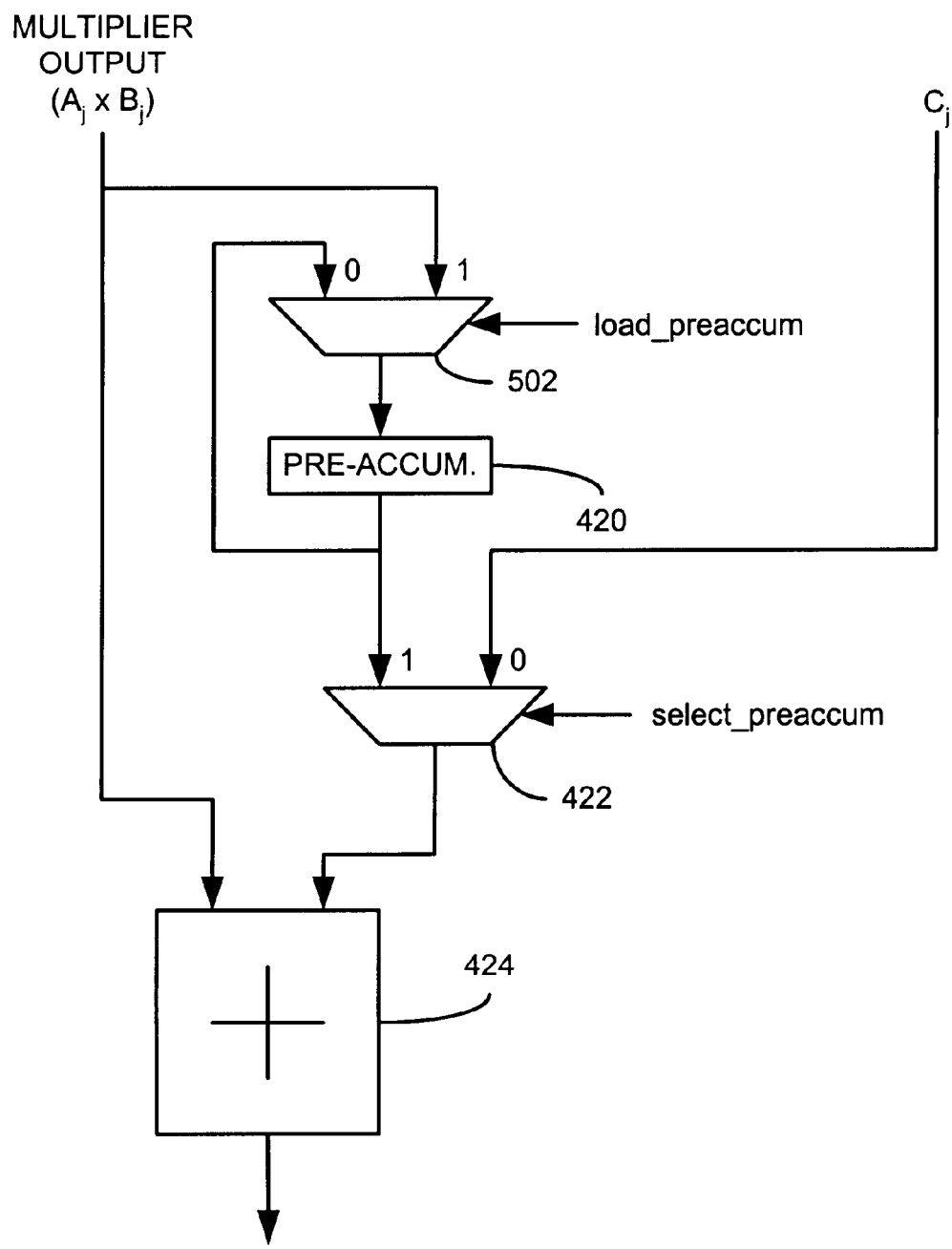
FIG. 5 is a block diagram illustrating the use of a pre-accumulator register in accordance with the present invention.

Operation of the pre-accumulation register 420 and selection block 422 are described in greater detail with reference to FIG. 5. In addition to the pre-accumulation register 420, the selection block 422 and the adder 424, a pre-accumulation register selection block 502 is also illustrated. Additionally, control signals used to control the selection block 422 and pre-accumulation register selection block 502 are also shown. Note that the 0 and 1 values illustrated next to the inputs of each of the selection block 422 and pre-accumulator register selection block 502 refer to the asserted/deasserted state of each of the respective control signals. Thus, when the output of the multiplier is to be provided directly to the adder 424 the "load pre-accumulator" control signal is not asserted and the pre-accumulation register 420 essentially loads its own value. Conversely, when the output of the multiplier is to be loaded to the pre-accumulator 420, the "load pre-accumulator" control signal is asserted. Likewise, when the "select pre-accumulation register" control signal is not asserted, the C component value is provided to the adder 424 via the selection block 422. However, when the "select pre-accumulation register" control signal is asserted, the value in the pre-accumulation register 420 is provided to the adder 424 via the selection block 422. Referring again to the example of the MADD instruction, the priority indication provided with the first multiply substitute instruction causes the PVS engine to assert the "load pre-accumulation register" control signal to the pre-accumulator register selection block 502. Thus, the output of the multiplier is stored into the pre-accumulation register 420. Thereafter, during execution of the additional MADD instruction, the "select pre-accumulation register" control signal provided to the selection block 422 is asserted thereby providing the intermediate result stored in the pre-accumulation register to the adder 424.

The present invention substantially overcomes the problem of instructions or op codes that require a number of input operands from a given data source that is greater than the total number of operands that that data source is capable of providing. Rather than adding memory or augmenting the output capabilities of the various data sources, the present invention overcomes this problem by recognizing the occurrence of such instructions and inserting substitute instructions in their place, which substitute instructions each do not require a number of input operands greater than the number of input operands that can be provided by the data source. This is preferably achieved using temporary storage already available in a PVS engine. In this manner, the present invention provides an inexpensive solution for a relatively infrequent occurrence, and thereby allows for more efficient, two-port PVS designs. The foregoing description of a preferred embodiment of the invention has been presented for purposes of illustration and description, it is not intended to be exhaustive or to limit invention to the precise form disclosed. The description was selected to best explain the principles of the invention and practical application of these principles to enable others skilled in the art to best utilize the invention and various embodiments, and various modifications as are suited to the particular use contemplated. It is intended that the scope of the invention not be limited by the specification, but be defined by the claims set forth below.

We claim:

1. In a graphics processing circuit, a method for executing a predefined code set which includes at least one (n+m) input operand instruction that requires (n+m) input operands at a time, the method comprising:

recognizing occurrence of the at least one (n+m) input operand instruction in which the (n+m) input operands are received from an n-output data source that provides no more than n operands at a time;

providing at least two substitute instructions in response to recognition of the at least one (n+m) input operand instruction in which the (n+m) input operands are received from the n-output data source, wherein each of the at least two substitute instructions requires no more than n-input operands from the n-output data source;

executing a first of the at least two substitute instructions using no more than n-input operands from the n-output data source to provide an intermediate result;

temporarily storing the intermediate result; and executing another of the at least two substitute instructions using the intermediate result and no more than n operands from the n-output data source.

2. The method of claim 1, wherein n=2 and m=1.

3. The method of claim 1, wherein the (n+m) input operands are unique relative to each other.

4. The method of claim 1, wherein the at least one (n+m) input operand instruction comprises a MADD instruction, and the at least two substitute instructions comprise a MUL instruction and another MADD instruction.

5. The method of claim 1, wherein the step of temporarily storing the intermediate result comprises storing the intermediate result in a pre-accumulation register.

6. The method of claim 1, wherein the step of executing the first of the at least two substitute instructions further comprises indicating the first of the at least two instructions to be a high priority instruction such that the other of the at least two instructions is executed immediately subsequent to the first of the at least two substitute instructions.

7. The method of claim 1, further comprising:

providing an output result based at least in part upon execution of the at least two substitute instructions.

8. In a programmable vertex shader comprising a controller coupled to a programmable vertex shader engine and a two-port temporary register memory coupled to the programmable vertex shader engine, a method for executing a three-input operand MADD (multiply and add) instruction that requires three-input operands at a time from the two-port temporary register memory, the method comprising:

recognizing, by the controller, occurrence of the thee-input operand MADD instruction requiring the three-input operands from the two-port temporary register memory;

providing, by the controller to the programmable vertex shader engine, a substitute two input operand MUL instruction and a substitute three-input operand MADD instruction;

executing, by the programmable vertex shader engine, the substitute two input operand MUL instruction using no more than two input operands at a time from the two-port temporary register memory to provide an intermediate result;

temporarily storing, by the programmable vertex shader engine, the intermediate result; and executing, by the programmable vertex shader engine, the substitute three-input operand MADD instruction using no more than two input operands at a time from the two-port temporary register memory.

9. The method of claim 8, wherein the three-input operands are unique relative to each other.

10. The method of claim 8, wherein the step of temporarily storing the intermediate result comprises storing, by the programmable vertex shader engine, the intermediate result in a pre-accumulation register.

11. The method of claim 8, wherein the step of executing the substitute two input operand MUL instruction further comprises indicating the substitute two input operand MUL instruction to be a high priority instruction such that the substitute three-input operand MADD instruction is executed immediately subsequent to the substitute two input operand MUL instruction.

12. The method of claim 8, further comprising:

providing, by the programmable vertex shader engine, an output result based at least in part upon execution of the substitute two input operand MUL instruction and the substitute three-input operand MADD instruction.

13. A programmable vertex shader comprising:

a programmable vertex shader engine;

a code memory comprising a plurality of instructions for execution by the programmable vertex shader engine;

an n-output temporary register memory, coupled to the programmable vertex shader engine, that provides as output no more than n operands at a time; and a programmable vertex shader controller, coupled to the code memory and the programmable vertex shader engine, that receives the plurality of instructions and monitors the plurality of instructions for occurrence of at least one (n+m) input operand instruction that requires (n+m) input operands from the n-output temporary register memory, wherein the programmable vertex shader controller provides at least two substitute instructions to the programmable vertex shader engine upon detecting the at least one (n+m) input operand instruction that requires the (n+m) input operands from the n-output temporary register memory, and wherein each of the at least two substitute instructions requires no more than n-input operands from to n-output temporary register memory.

14. The programmable vertex shader of claim 13, wherein n=2 and m=1.

15. The programmable vertex shader of claim 13, wherein the at least one (n+m) input operand instruction comprises a MADD instruction, and the at least two substitute instructions comprise a MUL instruction and another MADD instruction.

16. The programmable vertex shader of claim 13, wherein to programmable vertex engine executes a first of the at least two substitute instructions using no more than n-input operands from the n-output temporary register memory to provide an intermediate result, and executes another of the at least two substitute instructions based on the intermediate result and no more than n-input operands from the n-output temporary register memory.

17. The programmable vertex shader of claim 16, wherein the programmable vertex engine comprises a pre-accumulator register for storing the intermediate result.

18. A graphics processing circuit comprising the programmable vertex shader of claim 13.

19. A graphics processor comprising the graphics processing circuit of claim 18.

20. A graphics processor comprising the programmable vertex shader of claim 13.

21. An apparatus for executing a predefined code set which includes at least one (n+m) input operand instruction that requires (n+m) input operands at a time, the apparatus comprising:

means for recognizing occurrence of the at least one (n+m) input operand instruction in which the (n+m) input operands are received from an n-output data source that provides no more than n operands at a time;

means, responsive to the means for recognizing, for providing at least two substitute instructions in place of the at least one (n+m) input operand instruction in which the (n+m) input operands are received from the n-output data source, wherein each of the at least two substitute instructions requires no more than n-input operands from the n-output data source; and means, coupled to the means for providing, for executing a first of the at least two substitute instructions using no more than n-input operands from the n-output data source to provide an intermediate result, and for executing another of the at least two substitute instructions using the intermediate result and no more than a operands from the n-output data source.

22. The apparatus of claim 21, wherein the means for recognizing and the means for providing are embodied in a programmable vertex shader controller.

23. The apparatus of claim 21, wherein the means for executing is embodied by a programmable vertex shader engine.

24. The apparatus of claim 21, further comprising:

means, coupled to the means for executing, for temporarily storing the intermediate result.

25. The apparatus of claim 24, wherein the means for executing and the means for temporarily storing are embodied by a programmable vertex shader engine.

26. The apparatus of claim 24, wherein the means for temporarily storing are embodied by temporary register memory coupled to the means for executing.

* * * * *